March 24, 1942.    J. G. HEASLET    2,277,322
TRACK SUPPORT FOR CRAWLER TRACTORS
Filed Feb. 5, 1940    2 Sheets-Sheet 1

INVENTOR
JAMES G. HEASLET
BY
ATTORNEY

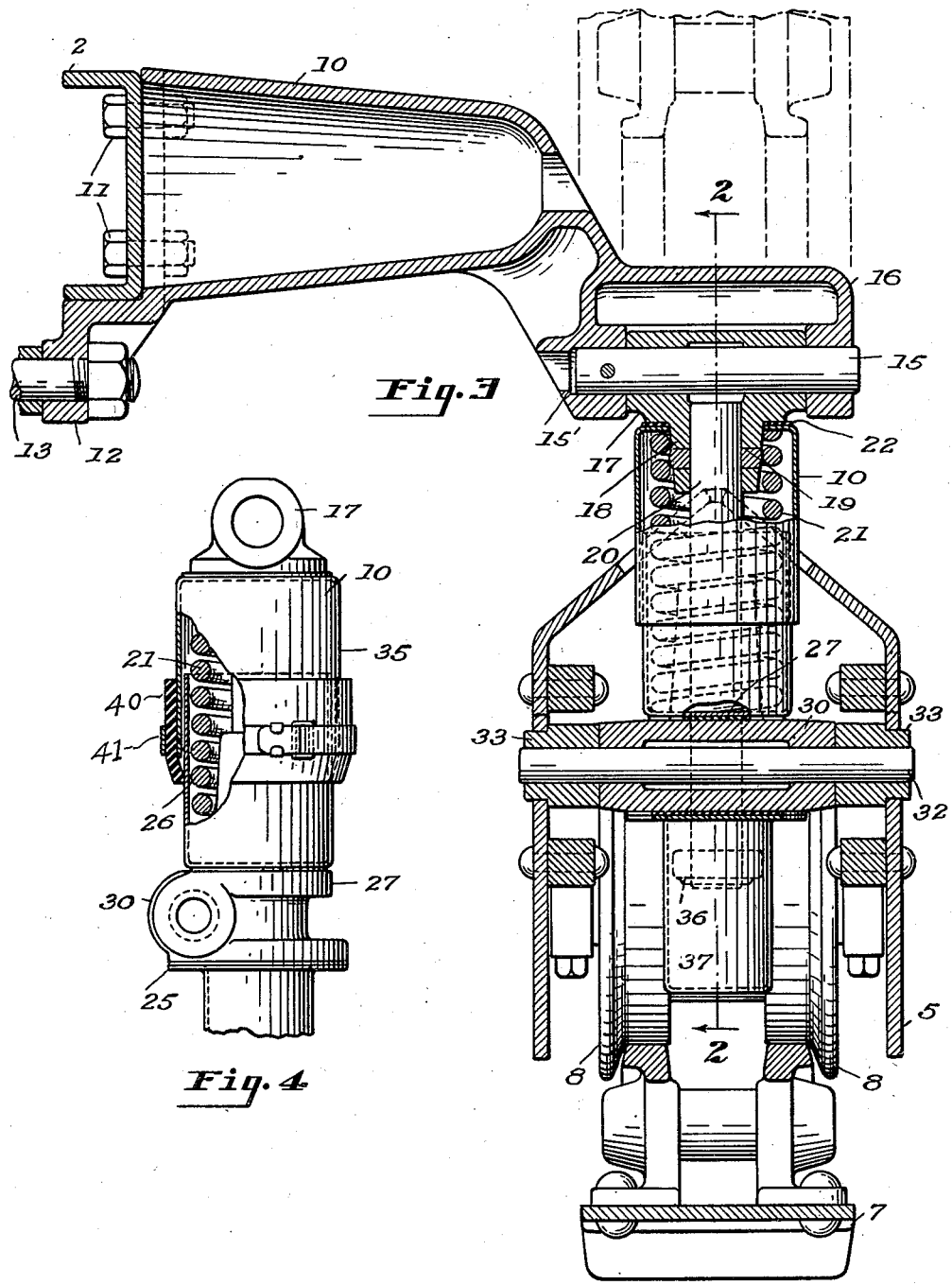

Patented Mar. 24, 1942

2,277,322

UNITED STATES PATENT OFFICE 2,277,322

TRACK SUPPORT FOR CRAWLER TRACTORS

James G. Heaslet, Hudson, Ohio, assignor to The Cleveland Tractor Company, Cleveland, Ohio Application February 5, 1940, Serial No. 317,425

6 Claims. (Cl. 305—9)

This invention relates to a front support for crawler type tractors and, more particularly, to suspension members joining the side chassis frames of the tractor to the pivoted track frames.

An object of this invention is to provide a flexible coupling between the tractor frame and pivoted side frames on which are mounted the driving sprocket idler and flexible track chains.

Numerous expedients have heretofore been designed for supporting the forward portion of the main tractor frame carrying the power plant with the pivoted track frames, which lie in spaced position on either side of the tractor frame so that the track frames may be moved independently when traversing irregular terrain. These prior expedients include lateral links, hydraulic mechanisms, pivoted bars and spring devices, but practically none of them have proved completely satisfactory nor have they been able to stand up under the hard service to which this type of vehicle is subjected.

By following the teachings of this invention, these objections are overcome by a simple mechanical and practical construction so arranged as to be reasonable to produce and easy to install and service. Furthermore, it permits independent movement of each track frame, while supporting the main tractor frame on even keel when the tractor is passing over obstructions or indentations.

Another feature of the invention is its ease of assembly and disassembly, together with its few moving parts, dirt proof qualities and general ruggedness.

In the drawings,

Fig. 3 is an enlarged vertical cross section with portions broken away taken on line 3—3 of Fig. 1; and Fig. 4 is a side elevation partly broken away of the compression and extension cylinder.

Figure 1:
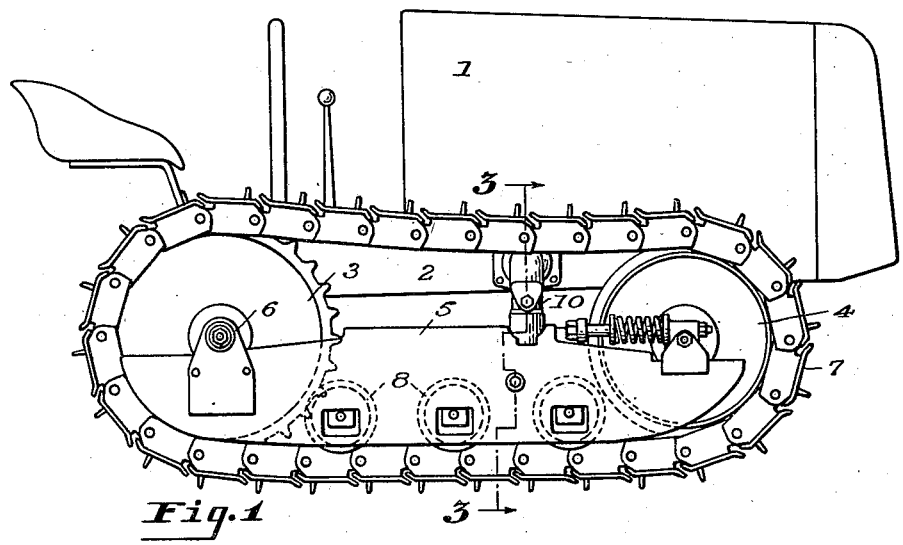
Fig. 1 is a side elevation of a conventional track-laying or crawler type tractor showing the position of the improved suspension or coupling between the main tractor frame and the pivoted side frames.
Figure 2:
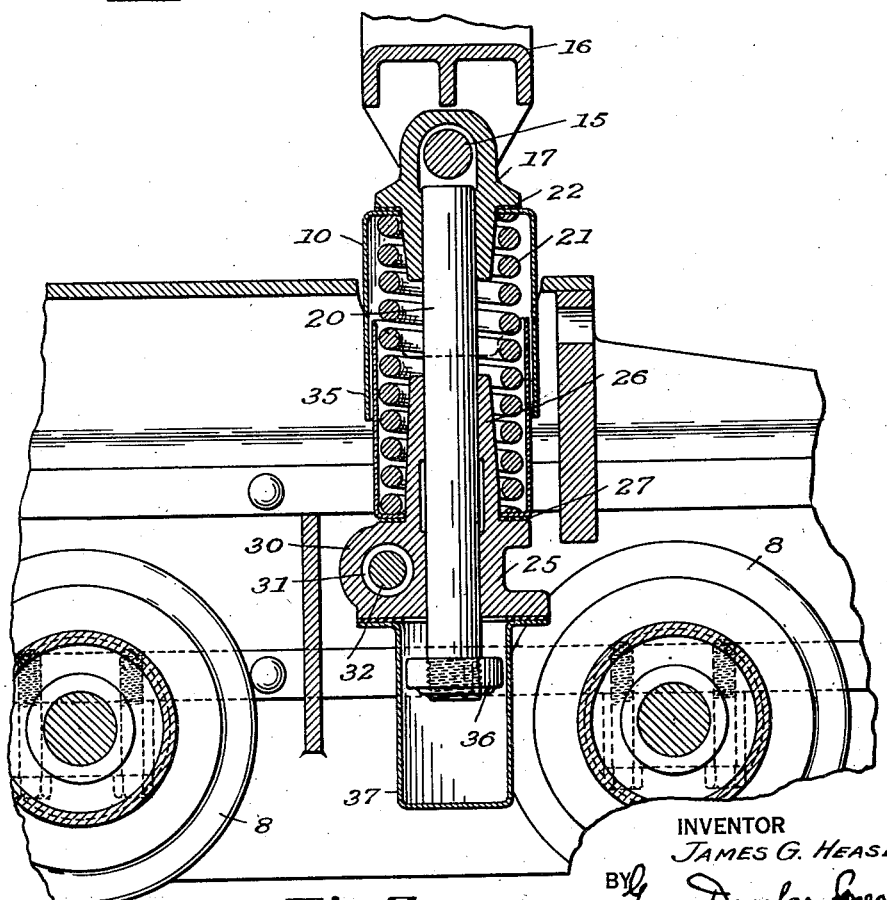
Fig. 2 is an enlarged vertical cross section taken on line 2—2 of Fig. 3.

In the drawings Fig. 1 denotes generally a crawler type tractor having a horizontal chassis frame 2, rearward drive sprockets 3 and front idlers 4. Laterally spaced side track frames 5 are pivotally supported to the rear drive axle 6 and as is usual the lower run of the track belts 7 and weight of the tractor is supported on lower rollers 8 mounted in the side frames.

The present specific invention relates to the suspension members or couplings which are rigidly secured to offset brackets mounted to opposite sides of the main tractor frame and connected with the pivoted side frames. The following description will set forth the details of construction of one of these suspension members and it will be understood that the second or opposite member is identical in construction.

A laterally extending bracket arm 10 is rigidly secured by bolts 11 to the tractor side frames 2 with the lower offset integral lug 12 of the arm joined to the opposite suspension member by a tight rod or spacer 13. The lateral brackets 10 are preferably hollow casings or forgings which extend laterally from the chassis frame with their outer ends terminating across the major width of the side frames 5. As shown in Fig. 3, each coupling has a horizontal pin 15 bearinged in the outer extension 16 of the bracket 10. A rock pin 15 is secured in the registering openings 15' in dependent parts 16 and a pivoted yoke 17 having a downwardly projecting cylindrical end 18 is supported on the pin 15 between the arms of member 16.

This pivoted yoke member is made with a vertical bore 19 extending upwardly to the center portion of the yoke and carries therein a fixed vertical pin 20. It will be understood that both pins 15 and 20 are press-fitted into their respective apertures. A sturdy compression spring 21 encircles the vertical pin 20 and presses against the shoulder 22 formed at the base of the cylindrical extension 18 of the yoke 17.

A second lower yoke member 25 having an upwardly extending cylindrical portion 26 and a horizontal shoulder 27 also encompasses the vertical pin 20 and is adapted to slide thereon. The lower end of compression spring 20 contacts the shoulder 27 of the yoke 25 and encircles the vertical extension sleeve 26 so that when movement is given the lower yoke, it compresses the spring between itself and upper yoke 22.

The lower yoke 25 is provided with an offset thickened transverse boss 30 having a horizontal passage 31 therein for the reception of pivot 32, which is in the nature of a rock pin. As shown in Fig. 3, the ends of the rock pin 32 are retained by means of a press-fit in bushings 33 positioned in the openings provided in opposite spaced walls of the side frames 5.

To insure that no dirt or grit will reach the vertical pin 20 on which the lower yoke 25 slides, it is preferable to encase the pin and spring with a telescopic dust guard 35, which, as clearly shown in the drawings, is mounted over and under the ends of the spring. The lower limit nut 36 threaded on the lower end of the rod 20 is also encased in dome-like dust guard 37. Fig. 4 discloses a modification of the telescoping dust guard wherein a flexible resilient ring 40 secured in place by band 41 overlies the end of the telescoping member and maintains a dirt shield between the moving parts.

In operation when the tractor is passing over uneven terrain, whether they be obstacles or depressions, each of the pivoted side frames are independently suspended so that each frame will rock or pivot in overcoming these unevennesses. For instance, if the tractor is proceeding in the direction shown in Fig. 1 and the right hand track encounters an obstacle, the entire side frame will pivot upwardly by reason of its support on rear axle 6, while permitting the tractor main frame to remain in a level position.

When the obstacle is encountered the front end of the side frame rises and pivots on rock shafts 15 and 31 and at the same time the lower yoke 25 is forced upwardly along the pin 20 against the compression of spring 21. After the obstacle is overcome, the reverse action takes place and the yoke 25 slides downwardly on pin 20 and the pin assumes its normal vertical position. As the rear part of the side frame is pivoted on axle 6 and the upper pin 15 is also fixed, it follows that the pin 31 moves in an arcuate path.

What I claim is:

1. In a crawler type tractor of the type having a main frame and rearwardly pivoted side frames, a forward suspension for said side frames, said suspension comprising lateral brackets secured to the main frame and extending across the side frames, spaced apart horizontal pivot pins lying at right angles to the main frame and fixedly mounted in the ends of the brackets and in the side walls of the side frames, yokes mounted on said pivot pins and a rod secured in the upper of said yokes and slidably passing through the lower of said yokes, the axes of the pivot pins secured in side frames being offset in a horizontal direction from the axes of the pivot pins in the brackets.

2. In a crawler type tractor of the type having a main frame and rearwardly pivoted side frames U-shaped in cross section, a forward suspension for said side frames, said suspension comprising lateral brackets secured to the main frame and extending across the side frames, spaced apart horizontal pivot pins lying at right angles to the main frame and fixedly mounted in the ends of the brackets and across the side walls of the side frames respectively, yokes pivotally mounted on said pivot pins, a vertical rod secured in the upper of said yokes and slidably passing through the lower of said yokes, and a compression spring mounted between the upper and lower pivot pins adapted to transmit the weight of the forward part of the main frame to the side frames.

3. In a crawler type tractor of the type having a main frame and rearwardly pivoted side frames, a forward suspension for said side frames, said suspension comprising lateral brackets secured to the main frame and extending across the side frames, spaced apart horizontal pivot pins lying at right angles to the main frame and fixedly mounted in the ends of the brackets and in the walls of the side frames, said pivot pins being in offset vertical alignment to one another, yokes mounted on said pivot pins, a rod fixedly secured in the upper of said yokes and slidably passing through the lower of said yokes, a compression spring encircling the said rod and a telescoping sectional casing enclosing said rod and spring.

4. In a crawler type tractor of the type having a main frame and rearwardly pivoted side frames, a forward suspension for said side frames, said suspension comprising lateral brackets secured to the main frame and extending across the side frames, spaced apart offset horizontal pivot pins lying at right angles to the main frame and fixedly mounted in the ends of the brackets and in the side walls of the side frames, swingable yokes mounted on said pivot pins, a depending rod secured in the upper of said yokes and slidably passing through the lower of said yokes, a spring positioned between said yokes and encircling the said rod and a telescoping sectional casing enclosing said spring, the end walls of said casing being retained against the upper and lower yokes by the ends of said spring.

5. In a tractor of the type having a main chassis frame and track frames pivoted on each side thereof, members secured to the sides of the main frame and connecting the forward portions of the track frames thereto, each of said members including a laterally extending arm having a horizontal pivot in the outer end thereof, an upper yoke embracing said pivot, a depending vertical rod secured in said yoke, a lower yoke through which the lower end of said rod passes, a nut on the lower end of the rod, a horizontal pivot secured in the side frame, said pivot passing through the rear portion of said lower yoke and a compression spring positioned between said upper and lower yokes and encircling the vertical rod.

6. In a crawler tractor of the type having a main frame and track frames pivoted to either side near the rear thereof, laterally extending brackets joining the forward portions of the track frames to the main frame, each bracket comprising an offset arm secured to the main frame, a horizontal pivot in the outer end of the arm lying at right angles to the main frame, a second horizontal pivot mounted in the track frame rearwardly of the first mentioned pivot, said second pivot being spaced from and parallel to the first pivot, pivoted yokes mounted on both of said pivots, a rod carried by the upper yoke adapted to pass through the lower yoke and a compression spring encompassing said rod with its ends bearing against the said yokes.

JAMES G. HEASLET.